United States Patent

Yamron et al.

[11] Patent Number: 6,052,657
[45] Date of Patent: Apr. 18, 2000

[54] TEXT SEGMENTATION AND IDENTIFICATION OF TOPIC USING LANGUAGE MODELS

[75] Inventors: Jonathan P. Yamron, Sudbury; Paul G. Bamberg, Marlborough; James Barnett, Auburndale; Laurence S. Gillick, Newton; Paul A. van Mulbregt, Wayland, all of Mass.

[73] Assignee: Dragon Systems, Inc., Newton, Mass.

[21] Appl. No.: 08/978,487

[22] Filed: Nov. 25, 1997

Related U.S. Application Data

[60] Provisional application No. 60/058,261, Sep. 9, 1997.
[51] Int. Cl.⁷ .............................. G06F 17/27; G10L 15/00
[52] U.S. Cl. .............................................. 704/9; 704/257
[58] Field of Search ........................... 704/1, 9, 10, 255, 704/257; 707/530, 531

[56] References Cited

U.S. PATENT DOCUMENTS

| | | |
|---|---|---|
| 4,663,675 | 5/1987 | Jones, Jr. et al. . |
| 4,783,803 | 11/1988 | Baker et al. . |
| 4,805,218 | 2/1989 | Bamberg et al. . |
| 4,805,219 | 2/1989 | Baker et al. . |
| 4,829,576 | 5/1989 | Porter . |
| 4,931,950 | 6/1990 | Isle et al. . |
| 5,027,406 | 6/1991 | Roberts et al. . |
| 5,251,131 | 10/1993 | Masand et al. ............................... 704/1 |
| 5,267,345 | 11/1993 | Brown et al. . |
| 5,278,980 | 1/1994 | Pedersen et al. . |
| 5,392,428 | 2/1995 | Robins ........................................ 704/9 |
| 5,418,951 | 5/1995 | Damashek ................................... 704/9 |
| 5,425,129 | 6/1995 | Garman et al. . |
| 5,428,707 | 6/1995 | Gould et al. . |
| 5,806,021 | 9/1998 | Chen et al. ................................. 704/9 |
| 5,835,888 | 11/1998 | Kanevsky et al. .......................... 704/9 |
| 5,839,106 | 11/1998 | Bellegarda .............................. 704/257 |

OTHER PUBLICATIONS

Lau, Raymond et al., "Trigger–Based Language Models: A Maximum Entropy Approach," Proceedings of ICASSP–94 (Apr. 1993), pp. II–45–II–48.
Hiroshi Furukawa et al.; "Method of Topic Processing for Cooperative Dialog Systems"; IEEE; Mar. 20, 1995.
PCT International Search Report.

*Primary Examiner*—Forester W. Isen
*Assistant Examiner*—Patrick N. Edouard
*Attorney, Agent, or Firm*—Fish & Richardson P.C.

[57] ABSTRACT

System for segmenting text and identifying segment topics that match a user-specified topic. Topic tracking system creates a set of topic models from training text containing topic boundaries using a clustering algorithm. User supplies topic text. System creates a topic model of the topic text and adds the topic model to the set of topic models. User-supplied test text is segmented according to the set of topic models. Segments relating to the same topic as the topic text are selected.

45 Claims, 5 Drawing Sheets

TEXT SEGMENTATION AND IDENTIFICATION OF TOPIC USING LANGUAGE MODELS

CROSS REFERENCE TO RELATED APPLICATIONS

This application claims priority from U.S. Provisional Application 60/058,261, filed Sep. 9, 1997.

BACKGROUND

The invention relates to segmenting topics in a stream of text.

Segmenting text involves identifying portions or segments of the text that are related to different topics. For example, people are adept at skimming through a newspaper and quickly picking out only the articles which are of interest to them. In this way, it is possible to read only a small fraction of the total text contained in the newspaper. It is not feasible, however, for someone to skim through the hundreds of newspapers, written in dozens of languages, that might contain articles of interest. Furthermore, it is very difficult to skim radio and TV broadcasts, even if they have already been recorded. In short, it is very difficult for people to analyze the full range of information that is potentially available to them.

Given a stream of text in which word or sentence boundaries have been identified, segmentation involves identifying points within the text at which topic transitions occur. One approach to segmentation involves querying a database in a database system. In particular, each sentence of the stream of text is used to query a database. Whether consecutive sentences are related to the same topic is determined based on the relatedness of the results of the query for each sentence. When the query results differ sufficiently, a topic boundary is inserted between the two sentences.

Segmentation also may be performed by looking for features that occur at segment boundaries (e.g., proper names often appear near the beginning of a segment, while pronouns appear later) and by monitoring for the occurrence of word pairs. Associated with each word pair is a probability that, given the occurrence of the first word in the word pair in a sequence of text, the second word in the word pair is likely to appear within a specified distance of the first word in the word pair. Sets of word pairs and associated probabilities are created from sets of training text dealing with topics of interest. Other sequences of text can then be segmented using this topic information. A contiguous block of text may be assigned the topic whose word pair probabilities best match the text block's word distribution.

SUMMARY

The invention provides a technique for use in segmenting a stream of text and identifying topics in the stream of text (i.e., identifying text that corresponds to a specified topic).

The technique employs a clustering method that takes as input a set of training text representing a discrete number of stories, where a story is a contiguous stream of sentences dealing with a single topic. The text contains words, sentence boundaries, and story boundaries (also referred to as topic transitions). The clustering method also takes as an input an indication of the number of clusters to be generated. The clustering method is designed to separate the input text into the specified number of clusters, where different clusters deal with different topics, a single cluster may include more than one topic, and, in most instances, a particular topic appears in only one cluster. Topics are not defined before applying the clustering method to the training text. Once the clusters are defined, a language model is generated for each cluster.

In one general aspect, the invention features segmenting a stream of text that is composed of a sequence of blocks of text into segments using a plurality of language models. The blocks of text, which may be, for example, sentences, paragraphs, or utterances (i.e., sequences of words) identified by a speech recognizor, are scored against the language models to generate language model scores for the blocks of text. A language model score for a block of text indicates a correlation between the block of text and the language model. Language model sequence scores for different sequences of language models to which a sequence of blocks of text may correspond are generated. A sequence of language models is selected based on one or more predetermined conditions. For example, the predetermined conditions may favor selection of the sequence of language models with the lowest language model sequence score. Segment boundaries in the stream of text are identified as corresponding to language model transitions in the selected sequence of language models.

A language model sequence score for a sequence of language models may be generated by summing language model scores for the sequence of blocks of text corresponding to the sequence of language models. For each language model transition in the sequence of language models, a switch penalty may be added to the language model sequence score. The switch penalty may be the same for each language model transition in the sequence of language models. Language model sequence scores may be generated by generating multiple language model sequence scores for a subsequence of the sequence of blocks of text, eliminating poorly scoring sequences of language models, adding a block of text to the subsequence, and repeating the generating, eliminating and adding steps. A poorly scoring sequence of language models may be a sequence of language models with a language model sequence score that is worse than another language model sequence score by more than a fall-behind amount, which may be equal to or less than the switch penalty. The switch penalty may be generated by selecting a stream of text for which the number of language model transitions is known, repeatedly segmenting the stream of text into segments using a plurality of switch penalties, and selecting a switch penalty that results in a number of language model transitions that is similar or equal to the known number of language model transitions.

The language models may be generated by clustering a stream of training text into a specified number of clusters and generating a language model for each cluster. The language models may be, for example, unigram language models.

The blocks of text may be scored against a language model corresponding to a topic of interest. Segments corresponding to the language model corresponding to the topic of interest may be identified as corresponding to the topic of interest.

In another general aspect, the invention features identifying a block of text relating to a topic of interest in a system that includes a plurality of language models, including a language model for a topic of interest. A stream of text containing text segments is obtained, and the text segments are scored against the language models to generate language model scores for the segments of text. A text segment is identified as being related to the topic of interest if the score of the text segment against the language model for the topic of interest satisfies a predetermined condition. The condition may vary based the importance of identifying all text related to a topic of interest in relation to the importance of not misidentifying text as being related to the topic of interest. For example, when identifying all text is more important, the predetermined condition may require that the score of the text segment against the language model for the topic of interest be the lowest score among the scores of the text segment against the plurality of language models, or differ from the lowest score by less than a predetermined amount. When not misidentifying text is more important, the predetermined condition may require the score for the topic of interest to be the lowest score and to differ from the next lowest score by more than a predetermined amount. The predetermined amount may be zero.

Among the advantages of the invention are one or more of the following.

One advantage of the technique is that it provides a basis for the efficient automated skimming of text for topics which are of interest to the reader. This is particularly advantageous when dealing with large quantities of text that would be impossible or prohibitively expensive for a human to scan in detail. Use of the technique results in an increase in the amount of information that a human analyst can monitor and assimilate. Furthermore, because the topics identified by the technique may be defined by training text provided by the user, the technique provides flexibility in the choice of topics to be tracked.

Another advantage is that the technique may be used in conjunction with a speech recognition system to provide integrated and automated topic tracking of recorded speech. By using the invention in conjunction with multiple speech recognition systems, each of which recognizes a different language, the invention may be used to track topics of text derived from speech in multiple languages. This is particularly advantageous for applications in which it is desirable to transcribe foreign broadcasts, break them into topics, and prioritize them based on topics.

Other features and advantages of the invention will become apparent from the following description, including the drawings, and from the claims.

DETAILED DESCRIPTION

Figure 1:
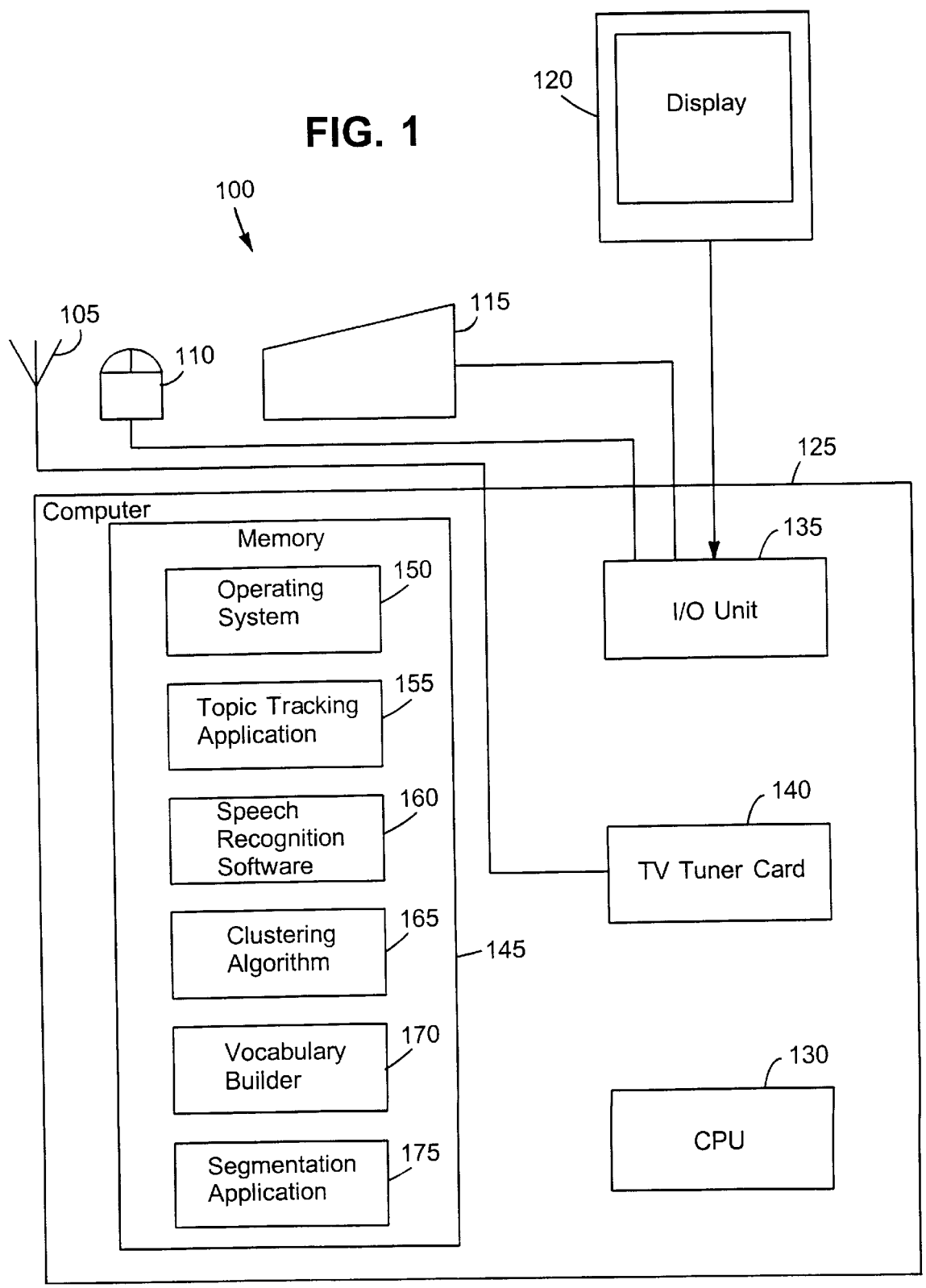
FIG. 1 is a block diagram of a topic tracking system.

Referring to FIG. 1, a topic tracking system 100 may include input/output (I/O) devices (e.g., microphone 105, mouse 110, keyboard 115, and display 120) and a general purpose computer 125 having a processor 130, an I/O unit 135 and a TV tuner card 140. A memory 145 stores data and programs such as an operating system 150, a topic tracking application 155, speech recognition software 160, a clustering algorithm 165, a vocabulary builder 170, and a segmentation application 175. For ease of discussion, the following description indicates that the software components carry out operations to achieve specified results. However, it should be understood that each component actually causes the processor 130 to operate in the specified manner. In addition, it should also be understood that the designation of different software components is for purposes of discussion and that other implementations may combine the functions of one or more components or may further divide the components.

A transcript of a television news broadcast which consists of a stream of sentences is considered as test text for purposes of the following discussion. The transcript does not indicate where in the stream one story ends and the next story begins, or where the story ends and a commercial begins. Assuming that each story or commercial covers a single topic, the segmentation task is to find topic boundaries within the transcript, i.e., to separate the transcript text into discrete segments, where each segment is a single story or commercial. As discussed below, segments for topics that match a user-specified topic also may be identified.

Figure 2:
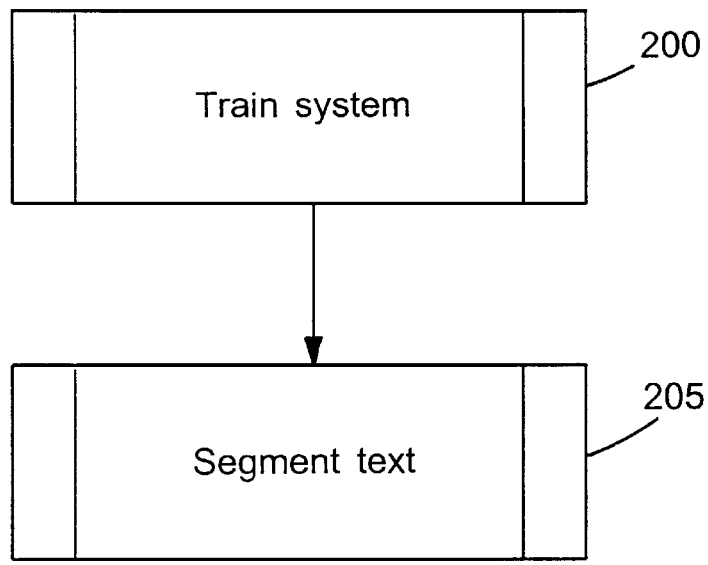
FIG. 2 is a flow diagram of a procedure for segmenting text in a stream of text.

Referring to FIG. 2, in general, segmenting the test text is a two-step process. First, the system is trained using training text (step 200). Next, the test text (or other text under consideration) is segmented (step 205).

Figure 3:
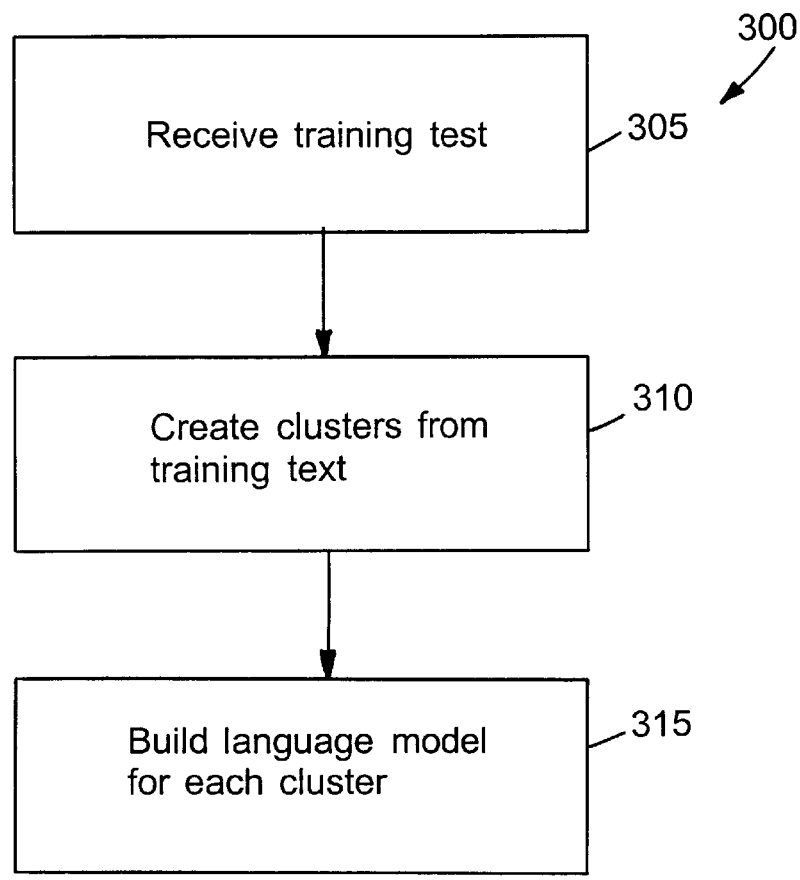
FIG. 3 is a flow diagram of a procedure for configuring a system to perform text segmentation.

A procedure 300 for training the system is illustrated in FIG. 3. First, training text is received (step 305). The training text includes a set of sentences with topic transitions positioned between groups of sentences, but without topic identifiers assigned to the groups of sentences.

Next, the clustering algorithm 165 is employed to divide the text into a specified number of topic clusters $\{c_1, c_2, \ldots, c_n\}$ using standard clustering techniques (step 310). For example, a K-means algorithm such as is described in *Clustering Algorithms*, John A. Hartigan, John Wiley & Sons, (1975), pp. 84–112, may be employed. Each cluster may contain groups of sentences that deal with multiple topics. However, all groups of sentences for a single topic will tend to be located in a single cluster. Test results have shown that for text consisting of stories from national news broadcasts, use of 100 clusters provides good results.

After clustering the training text, a unigram language model $lm_i$ (also referred to as a cluster model) is built for each cluster $c_i$ (step 315). A unigram language model for a cluster indicates the relative frequency at which particular words occur in the cluster. Other kinds of language models may also be used. For example, a bigram language model, which indicates the relative frequency at which pairs of words occur together, may be used. In any case, the language models are built using standard techniques.

For purposes of the following discussion, the system is assumed to be segmenting a set of test text produced for the purpose of evaluating the system. In actual implementations, the text being analyzed may be produced, for example, by a human transcriptionist or a speech recognition system. The text may correspond to television or radio broadcasts, or to intercepted radio or telephone communications. For example, referring also to FIG. 1, the text may be obtained by receiving audio, such as a news broadcast, through the antenna 105. Speech recognition software 160 then may convert the audio into computer-readable text and store the text in the memory 145 of the computer 125. For example, the antenna 105 may receive the news broadcast and convey the broadcast, in the form of an analog signal, to the television tuner card 140, which in turn passes audio portion of the broadcast through an analog-to-digital (A/D) converter to transform the analog signal into a set of digital samples. Under control of the operating system 150 and the speech recognition software 160, the processor 130 transforms the set of digital samples into text in a language recognized by the speech recognition software 160.

Figure 4:
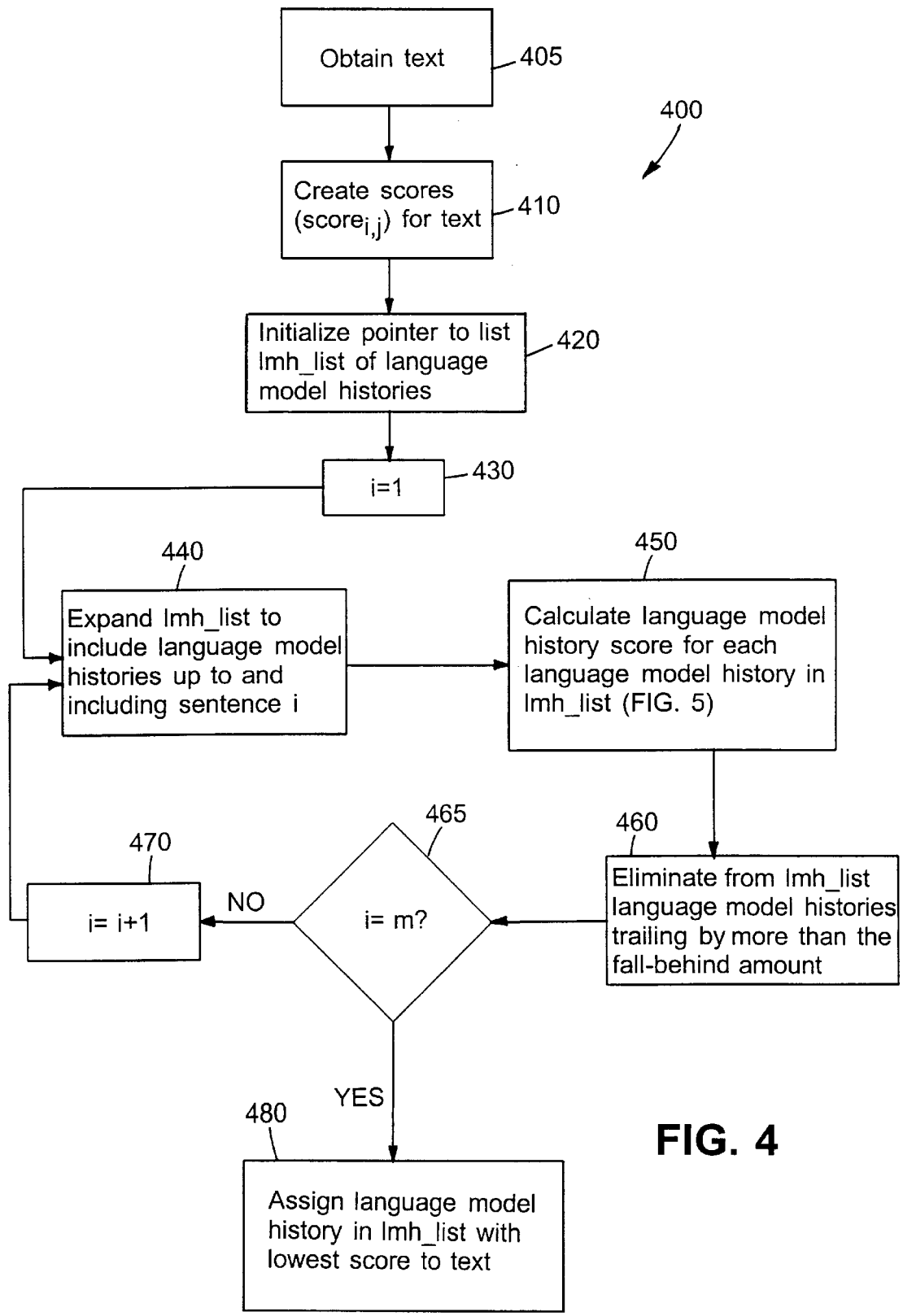
FIG. 4 is a flow diagram of a procedure for segmenting test text.

FIG. 4 illustrates a procedure 400 used by the segmenting application 175 to segment text after the system has been trained. First, text to be segmented is obtained (step 405). The text includes a stream of sentences $\{s_1, s_2, \ldots s_m\}$ where m is the number of sentences in the text. The text does not contain topic information or topic boundaries. The segmentation task is to identify consecutive groups of sentences (i.e., text segments) that correspond to common language models from the set of n language models $\{lm_1, lm_2, \ldots lm_n\}$. A language model is assigned to each sentence, so that the result of the segmentation process is a language model history $\{slm_1, slm_2, \ldots slm_m\}$, where $slm_i$ is the language model (from among the set of language models) assigned to sentence $s_i$ of the text. Since a particular topic generally is represented by only a single language model, an implicit topic boundary exists at each transition within the language model history.

After the text is obtained, each sentence in the text is scored against the language models (step 410), resulting in scores $score_{i,j}$, where $1<=i<=m$, $1<=j<=n$, m is the number of sentences, and n is the number of clusters. In other words, $score_{i,j}$ is the score of sentence number i of the text against language model number j. Table 1 shows example sentence scores for a test text containing two sentences, scored in each of three language models. The score of a sentence against a language model indicates the degree of correlation between the block of text and the language model. The scores are maintained as negative logarithmic values so that lower scores are better than higher scores.

TABLE 1

|  |  | Sentence Number | |
|---|---|---|---|
|  |  | 1 | 2 |
| Language | 1 | 100 | 60 |
| Model | 2 | 50 | 70 |
| Number | 3 | 40 | 180 |
| (Topic) |  |  |  |

The segmentation application 175 calculates language model history sums for different language model histories, where a language model history is a sequence of language models that correspond to a sequence of sentences. A language model history sum for a language model history equals the sum of the score of each sentence/language model pair in the language model history, plus a fixed switch penalty for each language model transition within the language model history. Instead of using a fixed switch penalty for all language model transitions, each possible language model transition may be assigned a switch penalty. An additional, "non-switch" penalty may be employed in the event that there is no language model transition between sentences. This non-switch penalty may differ for different language models so as to account for the expected length of segments of text for topics associated with each language model.

An appropriate value for the switch penalty may be determined by repeatedly performing multiple iterations of segmentation on a set of text for which the number of correct topic boundaries is known in advance. After each iteration, the switch penalty is adjusted until the segmentation (step 205) results in the roughly the right number of topic boundaries, or in placing the topic boundaries in roughly the right places.

Table 2 illustrates language model history sums for all possible language model histories associated with the test text in Table 1, using a single switch penalty of 100 and no non-switch penalty. Referring to the fourth row of Table 2, the language model history $\{2, 1\}$ represents an assignment of language model number 2 to sentence number 1 of the text, and an assignment of language model number 1 to sentence number 2 of the test text. The language model history sum for this language model history is 210, representing the score of sentence number 1 for language model number 2 (50), plus the score of sentence number 2 for language model number 1 (60), plus a switch penalty of 100 for switching language models between sentence number 1 and sentence number 2. As shown in the fifth row of Table 2, the language model history $\{2, 2\}$ represents an assignment of language model number 2 to the first and second sentences of the text. The language model history sum for this language model history is 120, representing the score of sentence number 1 for language model number 2 (50), plus the score of sentence number 2 for language model number 2 (70). No switch penalty is applied, because both sentences are assigned to the same topic.

Referring to Table 2, a final language model history of $\{2, 2\}$ should be assigned to the text, because the language model history sum for the language model history of $\{2, 2\}$ is the minimum of all possible language model history sums calculated for the text.

TABLE 2

| Language model history | Sum |
|---|---|
| $\{1, 1\}$ | 160 (100 + 60) |
| $\{1, 2\}$ | 270 (100 + 70 + 100) |
| $\{1, 3\}$ | 380 (100 + 180 + 100) |
| $\{2, 1\}$ | 210 (50 + 60 + 100) |
| $\{2, 2\}$ | 120 (50 + 70) |
| $\{2, 3\}$ | 330 (50 + 180 + 100) |
| $\{3, 1\}$ | 200 (40 + 60 + 100) |
| $\{3, 2\}$ | 210 (40 + 70 + 100) |
| $\{3, 3\}$ | 220 (40 + 180) |

Next, consider the test text of Table 1 with an additional sentence. The scores for this new test text are shown in Table 3.

TABLE 3

|  |  | Sentence Number | | |
|---|---|---|---|---|
|  |  | 1 | 2 | 3 |
| Language | 1 | 100 | 60 | 50 |
| Model | 2 | 50 | 70 | 140 |
| Number | 3 | 40 | 180 | 35 |
| (Topic) |  |  |  |  |

Using a switch penalty of 100, the test text should be assigned the language model history $\{3, 1, 1\}$, because the language model history sum of the language model history $\{3, 1, 1\}$ is 250 (40+60+50+100), which is the lowest language model history sum among all possible language model history sums for the test text. A language model/topic boundary therefore exists between sentence number 1 and sentence number 2.

As shown in FIG. 4, once a set of scores $\{score_{i,j}\}$ is created for the text (step 410), a pointer to a list lmh_list of all language model histories generated so far is then initialized (step 420). Next, a variable i, representing the sentence number of the sentence in the text currently being processed, is initialized with a value of 1 (step 430).

The list of language model histories lmh_list is expanded to include all possible language model histories for the text up to and including sentence number i (step 440). For example, in the case of the text and language models of Table 1, when i=1, lmh_list will include the language model histories {1}, {2}, and {3} after the application of step 430. Similarly, when i=2, lmh_list will include the language model histories {1, 1}, {1, 2}, {1, 3}, {2, 1}, {2, 2}, {2, 3}, {3, 1}, {3, 2}, and {3, 3} after the application of step 430.

Figure 5:
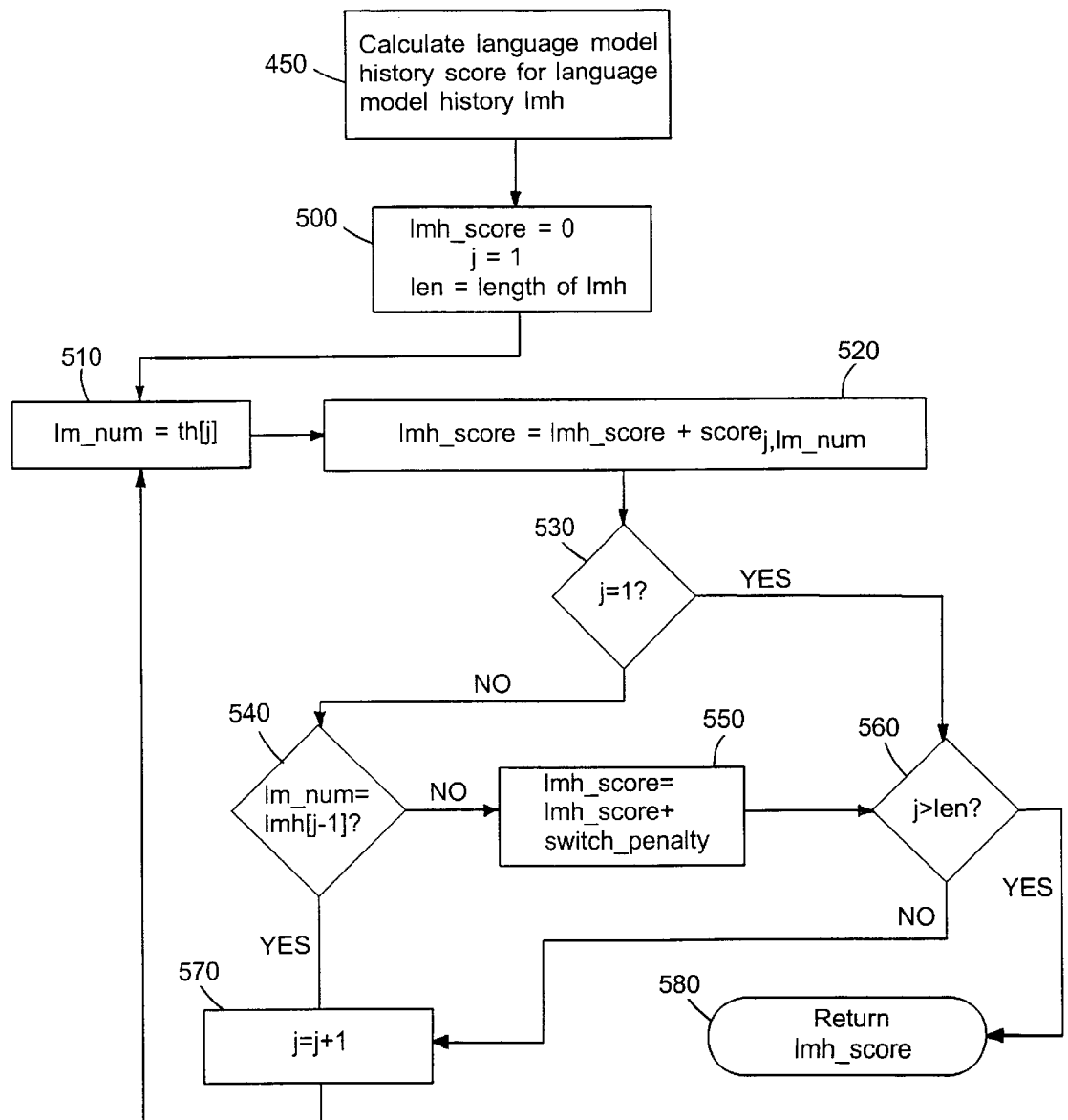
FIG. 5 is a flow diagram of a procedure for calculating a language model history score.

A language model history score is then calculated for each language model history lmh (step 450), as shown in more detail in FIG. 5. Any language model history in lmh_list with a language model history score that is greater than the language model history with the lowest language model history score by more than a configurable fall-behind amount is eliminated from lmh_list (step 460). If the fall-behind amount is equal to the switch penalty, the high scoring language model history will never have a score lower than the low scoring language model history and, therefore, will never result in the best (lowest) scoring language model history.

If i is not equal to m (the number of sentences in the text) (step 465), then i is incremented (step 470), and steps 440–460 are repeated. Otherwise, the language model history in lmh_list with the lowest language model history score is assigned to the text (step 480).

Referring to FIG. 5, a language model history score is calculated for a language model history lmh as follows. First, some local variables are initialized (step 500). Specifically, local variable lmh_score (which holds a running language model history score for language model history lmh) is initialized to zero, local variable j (which indicates the sentence number of the text sentence currently being examined) is initialized to one, and local variable len is initialized to the length of language model history lmh.

The local variable lm_num is set to the language model number of the jth entry in language model history lmh (step 510). The value of lmh_score then is increased by the score of sentence number j in language model number lm_num (step 520). Steps 530–560 increase the value of lmh_score by the switch penalty, if necessary. Specifically, if j=1 (decision step 530), then no switch penalty is ever applied. If j is greater than 1 (decision step 530), then lmh_score is increased by the switch penalty (step 550) if the current topic (lm_num) is different from the previous topic (lmh[j−1]) (decision step 540).

If all language models in the language model history have been processed (decision step 570), then lmh_score is returned (step 580). Otherwise, j is incremented (step 570), and steps 510–560 are repeated.

Figure 6:
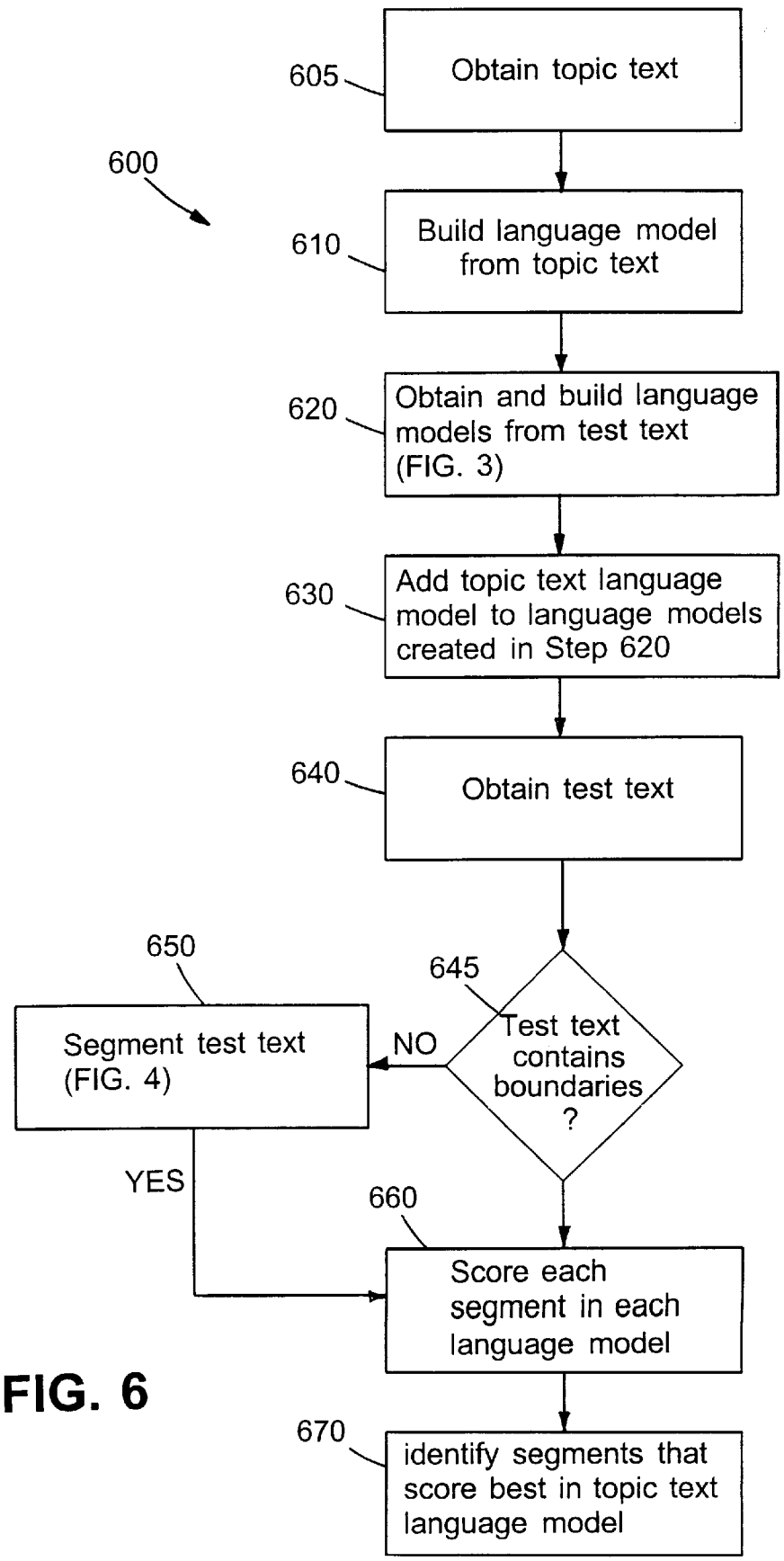
FIG. 6 is a flow diagram of a procedure for performing topic tracking on text.

Referring to FIG. 6, segments of a stream of test text that correspond to a particular topic may be identified according to a procedure 600. First, the user specifies a topic by providing topic text relating to the topic (step 605). Next, a language model of the topic text (referred to as the topic text language model) is built as discussed above (step 610). The system then is trained using training text to produce language models as described above (step 620). The topic text language model then is added to the set of language models (step 630).

A stream of test text is then obtained (step 640). If the test text does not contain segment (story) boundaries (decision step 645), then the test text is segmented (step 650). Each segment of the test text is then scored in each of the language models (step 660). Scores produced in step 660 may include a penalty which increases with each successive segment scored. Such a penalty may be used, for example, if the topic represented by the topic text is a time-specific event (e.g., occurrence of an earthquake) and the segments of the test text are ordered from oldest to newest (e.g., a stream of news broadcasts). In such a case the penalty reflects the decreasing likelihood over time that the topic represented by the topic text will occur in the test text.

A segment may be identified as corresponding to the topic defined by the topic text if the segment scored better against the topic text language model than against any other language model (step 670). Alternatively, a segment may be identified as corresponding to the topic defined by the topic text if the segment scored better against the topic text language model than against any other language model by more than a predetermined amount.

Other embodiments are within the scope of the following claims. For example, the techniques described here are not limited to any particular hardware or software configuration; they may find applicability in any computing or processing environment that may be used for speech recognition. The techniques may be implemented in hardware or software, or a combination of the two. Preferably, the techniques are implemented in computer programs executing on programmable computers that each include a processor, a storage medium readable by the processor (including volatile and non-volatile memory and/or storage elements), at least one input device, and at least one output device. Program code is applied to data entered using the input device to perform the functions described and to generate output information. The output information is applied to one or more output devices.

Each program is preferably implemented in a high level procedural or object oriented programming language to communicate with a computer system. However, the programs can be implemented in assembly or machine language, if desired. In any case, the language may be a compiled or interpreted language.

Each such computer program is preferably stored on a storage medium or device (e.g., CD-ROM, hard disk or magnetic diskette) that is readable by a general or special purpose programmable computer for configuring and operating the computer when the storage medium or device is read by the computer to perform the procedures described in this document. The system may also be considered to be implemented as a computer-readable storage medium, configured with a computer program, where the storage medium so configured causes a computer to operate in a specific and predefined manner.

What is claimed is:

1. A method for segmenting a stream of text into segments using a plurality of language models, the stream of text including a sequence of blocks of text, the method comprising:

scoring the blocks of text against the language models to generate language model scores for the blocks of text, the language model score for a block of text against a language model indicating a correlation between the block of text and the language model;

generating language model sequence scores for different sequences of language models to which a sequence of blocks of text may correspond, a language model sequence score being a function of the scores of a sequence of blocks of text against a sequence of language models;

selecting a sequence of language models that satisfies a predetermined condition; and identifying segment boundaries in the stream of text that correspond to language model transitions in the selected sequence of language models.

2. The method of claim 1, wherein generating a language model sequence score for a sequence of language models comprises summing language model scores for the sequence of blocks of text corresponding to the sequence of language models.

3. The method of claim 2, further comprising:

for each language model transition in the sequence of language models, adding to the language model sequence score a switch penalty.

4. The method of claim 3, wherein the switch penalty is the same for each language model transition in the sequence of language models.

5. The method of claim 4, wherein the switch penalty is determined by:

selecting a stream of text for which the number of language model transitions is known;

repeatedly segmenting the stream of text into segments using a plurality of switch penalties; and selecting a switch penalty resulting in a number of language model transitions that is similar to the known number of language model transitions.

6. The method of claim 1, wherein generating language model sequence scores comprises:

generating multiple language model sequence scores for a subsequence of the sequence of blocks of text;

eliminating poorly scoring sequences of language models; and adding a block of text to the subsequence and repeating the generating and eliminating steps.

7. The method of claim 6, wherein:

a poorly scoring sequence of language models is a sequence of language models with a language model sequence score that is worse than another language model sequence score by more than a fall-behind amount.

8. The method of claim 7, wherein:

generating a language model sequence score for a sequence of language models comprises, for each language model transition in the sequence of language models, adding to the language model sequence score a switch penalty; and the fall-behind amount equals the switch penalty.

9. The method of claim 1, wherein selecting a language model sequence based on a predetermined condition comprises:

selecting a language model sequence with a language model sequence score that is the minimum of the calculated language model sequence scores.

10. The method of claim 1, wherein a block of text comprises a sentence.

11. The method of claim 1, wherein a block of text comprises a paragraph.

12. The method of claim 1, wherein a block of text comprises an utterance identified by a speech recognizor.

13. The method of claim 12, wherein an utterance comprises a sequence of words.

14. The method of claim 1, wherein the language models are generated by:

clustering a stream of training text into a specified number of clusters; and generating a language model for each cluster.

15. The method of claim 1, wherein the language models comprise unigram language models.

16. The method of claim 1, wherein the language models comprise bigram language models.

17. The method of claim 1, further comprising scoring the blocks of text against a language model for a topic of interest.

18. The method of claim 17, further comprising identifying segments that correspond to the language model for the topic of interest as corresponding to the topic of interest.

19. A method for identifying a block of text as relating to a topic of interest, in a system comprising a plurality of language models, including a language model for the topic of interest, the method comprising:

obtaining a stream of text comprising text segments;

scoring the text segments against the plurality of language models to generate language model scores for the text segments;

identifying a text segment from among the text segments as block of text relating to the topic of interest if the score of the text segment against the language model for the topic of interest satisfies a predetermined condition.

20. The method of claim 19, wherein the predetermined condition requires the score of the text segment against the language model for the topic of interest to differ from the lowest score among the scores of the text segment against the plurality of language models by less than a predetermined amount, or to be the lowest score.

21. The method of claim 19, wherein the predetermined condition requires the score of the text segment against the language model for the topic of interest to be the lowest score among the scores of the text segment against the plurality of language models, and that the next lowest score among the scores of the text segment against the plurality of language models be greater than the score of the text segment against the language model for the topic of interest by more than a predetermined amount.

22. The method of claim 21, wherein the predetermined amount is zero.

23. A computer program tangibly stored on a computer-readable medium and operable to cause a computer to segment a stream of text into segments using a plurality of language models, the stream of text including a sequence of blocks of text, comprising instructions to:

score the blocks of text against the language models to generate language model scores for the blocks of text, the language model score for a block of text against a language model indicating a correlation between the block of text and the language model;

generate language model sequence scores for different sequences of language models to which a sequence of blocks of text may correspond, a language model sequence score being a function of the scores of a sequence of blocks of text against a sequence of language models;

select a sequence of language models based on a predetermined condition; and identify segment boundaries in the stream of text that correspond to language model transitions in the selected sequence of language models.

24. The computer program of claim 23, wherein instructions to generate a language model sequence score for a sequence of language models comprise instructions to sum language model scores for the sequence of blocks of text corresponding to the sequence of language models.

25. The computer program of claim 24, further comprising instructions to, for each language model transition in the sequence of language models, add to the language model sequence score a switch penalty.

26. The computer program of claim 25, wherein the switch penalty is the same for each language model transition in the sequence of language models.

27. The computer program of claim 26, wherein the switch penalty is determined by instructions to:

select a stream of text for which the number of language model transitions is known;

repeatedly segment the stream of text into segments using a plurality of switch penalties;

select a switch penalty resulting in a number of language model transitions that is similar to the known number of language model transitions.

28. The computer program of claim 23, wherein instructions to generate language model sequence scores comprises instructions to:

generate multiple language model sequence scores for a subsequence of the sequence of blocks of text;

eliminate poorly scoring sequences of language models; and add a block of text to the set and repeat the instructions to generate and eliminate steps.

29. The computer program of claim 28, wherein a poorly scoring sequence of language models is a sequence of language models with a language model sequence score that is worse than another language model sequence score by more than a fall-behind amount.

30. The computer program of claim 29, wherein instructions to generate a language model sequence score comprises instructions, for each language model transition in the sequence of language models, to add to the language model sequence score a switch penalty, and wherein the fall-behind amount equals the switch penalty.

31. The computer program of claim 23, wherein instructions to select a language model sequence based on the predetermined condition comprise instructions to select a language model sequence with a language model sequence score that is the minimum of the calculated language model sequence scores.

32. The computer program of claim 23, wherein a block of text comprises a sentence.

33. The computer program of claim 23, wherein a block of text comprises a paragraph.

34. The computer program of claim 23, wherein a block of text comprises an utterance identified by a speech recognizor.

35. The computer program of claim 34, wherein an utterance comprises a sequence of words.

36. The computer program of claim 23, wherein the language models are generated by instructions to:

cluster a stream of training text into a specified number of clusters; and generate a language model for each cluster.

37. The computer program of claim 23, wherein the language models comprise unigram language models.

38. The computer program of claim 23, wherein the language models comprise bigram language models.

39. The computer program of claim 23, further comprising instructions to score the blocks of text against a language model for a topic of interest.

40. The computer program of claim 39, further comprising instructions to identify segments that correspond to the language model for the topic of interest as corresponding to the topic of interest.

41. A computer program tangibly stored on a computer-readable medium and operable to cause a computer to identify a block of text relating to a topic of interest, in a system comprising a plurality of language models, including a language model for a topic of interest, comprising instructions to:

obtain a stream of text comprising text segments;

score the text segments against the plurality of language models to generate language model scores for the segments of text; and identify a text segment from among the text segments as a block of text relating to the topic of interest if the score of the text segment against the language model for the topic of interest satisfies a predetermined condition.

42. The computer program of claim 41, wherein the predetermined condition requires the score of the text segment against the language model for the topic of interest to differ from the lowest score among the scores of the text segment against the plurality of language models by less than a predetermined amount, or to be the lowest score.

43. The computer program of claim 41, wherein the predetermined condition requires that the score of the text segment against the language model for the topic of interest be the lowest score among the scores of the text segment against the plurality of language models, and that the next lowest score among the scores of the text segment against the plurality of language models be greater than the score of the text segment against the language model for the topic of interest by more than a predetermined amount.

44. The computer program of claim 43, wherein the predetermined amount is zero.

45. A method for identifying text relating to a topic of interest, in a system comprising a plurality of language models, $lm_j$, where j ranges from 1 to n, and n is a maximum number of language models, including a language model $lm_t$ relating to a topic of interest t, the method comprising:

obtaining a stream of text comprising text segments $s_i$, where i ranges from 1 to m, and m is a maximum number of text segments in the stream of text;

scoring the text segments $s_i$ against the plurality of language models $lm_j$ to generate language model scores $score_{i,j}$ for each of the segments of text $s_i$, where $score_{i,j}$ is a score of text segment i of the stream of text against language model number j;

for a text segment $s_k$ from among the set of text segments $s_i$ for $1 \epsilon \{1,m\}$, relating that text segment $s_k$ to the topic of interest t if the score $score_{k,t}$ of the text segment against the language model $lm_t$ for the topic of interest t satisfies a predetermined condition.

* * * * *